Sept. 23, 1969  E. B. PARKES  3,468,554

REAR SUSPENSION SYSTEMS FOR ROAD VEHICLES

Filed May 10, 1967

United States Patent Office 3,468,554
Patented Sept. 23, 1969

3,468,554
REAR SUSPENSION SYSTEMS FOR ROAD VEHICLES
Eric Bernard Parkes, Selly Oak, Birmingham, England, assignor to Joseph Lucas (Industries) Limited, Birmingham, England, a British company
Filed May 10, 1967, Ser. No. 637,451
Claims priority, application Great Britain, May 20, 1966, 22,547/66
Int. Cl. B60g 23/00, 19/02
U.S. Cl. 280—6           1 Claim

ABSTRACT OF THE DISCLOSURE

A road vehicle rear suspension system which allows for changes in the load at the rear of the vehicle to keep the headlights level includes a pair of devices of adjustable length forming parts respectively of the connecting linkages between rear wheels and frame of the vehicle, so that the lengths of the devices determine the height of the rear portion of the vehicle, a pair of reversible motors for simultaneously adjusting the devices, and limit switches controlling the motors to determine the maximum lengths of the devices.

Background of the invention

When the rear portion of a road vehicle is loaded, it moves downwardly relative to the rear wheels, with the result that the vehicle headlights are tilted, giving rise to the possibility of dazzling oncoming traffic at night. This risk is considerably greater in the case of vehicles fitted with fluid suspension. The present invention is primarily, but not exclusively, intended for use in such vehicles.

Summary of the invention

A rear suspension system according to the invention includes a lengthwise adjustable unit operably connected between each rear wheel and the frame of the vehicle, so that the lengths of the units determine the height of the rear portion of the vehicle relative to the rear wheels when the vehicle is at rest, a reversible electric motor operably related to each adjustable unit for simultaneously adjusting the lengths of the units, and a pair of limit switches controlling for each adjustable unit and operably coupled to each motor for the motors to determine the maximum and minimum lengths of the adjustable units.

Brief description of the drawings

In the accompanying drawings.

Detailed description of the invention

Figure 1:
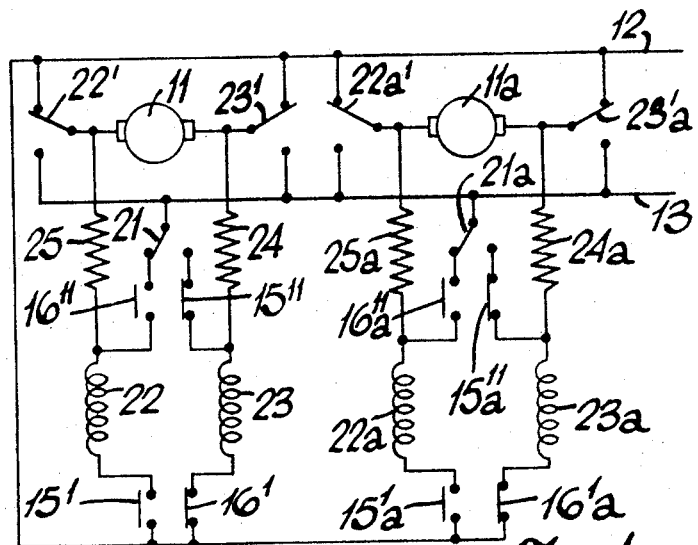
FIGURE 1 is a circuit diagram illustrating one example of the invention particularly designed for use with a vehicle having fluid suspension.
Figure 2:
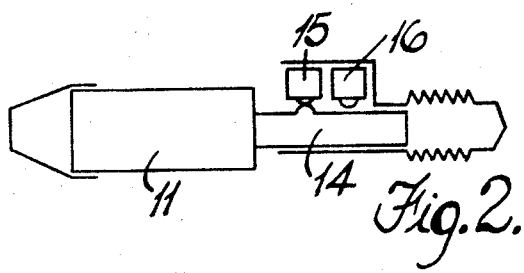
FIGURE 2 is a diagrammatic illustration of the operation of the limit switches.

Referring to the drawings, a pair of reversible electric motors 11, 11a are connected between supply lines 12, 13 energized by the vehicle battery. The motors 11, 11a control a pair of screw jacks, one of which is shown at 14. The screw jacks are connected respectively between the rear wheels of the vehicle and the fluid suspension units associated with the rear wheels, so that the height of the rear portion of the vehicle when the vehicle is at rest is determined by the length of the screw jacks.

Since the operation to control the two rear wheels is identical, the operation of the motor 11 only will be described. The screw jack 14 associated with the motor 11 controls a pair of limit switches 15, 16 with the arrangement being such that the limit switch 15 is operated when the jack is in one stable position having its shortest value, and the limit switch 16 is operated when the jack is in its other stable position having its longest value. The switch 15 has a normally closed contact $15^1$ and a normally open contact $15^{11}$, it being understood that these contacts are shown open and closed respectively in the drawing because the switch 15 is, in the position shown, operated by the screw jack. The switch 16 has a normally closed contact $16^1$ and a normally open contact $16^{11}$.

Operation of the motor is controlled by a switch 21, which in use is operated by the driver of the vehicle. The switch 21 controls a pair of relays 22, 23 having contacts $22^1$, $23^1$ controlling current flow through the motor. Assuming that the parts are in the position shown, with the rear portion of the vehicle in its lower position relative to the rear wheels, then if the driver is carrying a load in the rear of the vehicle, it is advisable for him to raise the rear of the vehicle relative to the rear wheels. For this purpose, he moves the switch 21 into the alternative position indicated, and thus completes a circuit from the line 13 through the switch 21, the contact $15^{11}$, relay 23 and contact $16^1$ to the line 12. Energization of relay 23 moves the contact $23^1$ to its alternative position, so that a circuit to the motor is completed from the line 12 through the contact $22^1$, the armature of the motor and the contact $23^1$ to the line 13. The motor therefore operates the screw jack, and the initial movement of the jack causes the contact $15^1$ to close, and the contact $15^{11}$ to open. At this stage, the relay 23 remains energized by way of its contact $23^1$, a resistor 24 and the contact $16^1$. Closing of the contact $15^1$ has no effect on the circuit. When the screw jack reaches its desired maximum length, the switch 16 is operated, and thus the contact $16^{11}$ closes, but has no effect. However, the contact $16^1$ opens, and breaks the circuits to the relay 23, so that the relay contact $23^1$ returns to the position shown, and the motor stops.

When it is desired to lower the rear portion of the vehicle again, the switch 21 is returned to the position shown, and because the contact $16^{11}$ is now closed, the relay 22 is energized and the motor is operated in the reverse direction with the relay self-holding until the screw jack reaches the position indicated, at which point the contact $15^1$ opens and the components all return to the position shown in the drawings.

It will be appreciated that the switch 21a associated with the motor 11a is operated at the same time as the switch 21, and that the portion of the circuit associated with the motor 11a operates in exactly the same way as the portion described. The components associated with the motor 11a are numbered to correspond with these associated with the motor, but with the addition of the suffix a.

The purpose of the resistors 24, 24a, 25 25a is to prevent short-circuiting of the lines 12, 13.

Having thus described my invention what I claim as new and desire to secure by Letters Patent is:

1. A rear suspension system for a road vehicle having a frame and rear wheels, including a lengthwise adjustable unit operably connected between each rear wheel and the frame of the vehicle, so that the lengths of said units determine the height of the rear portion of the vehicle relative to the rear wheels when the vehicle is at rest, a reversible electric motor operably related to each adjustable unit for simultaneously adjusting the lengths of said units, and a pair of limit switches for each adjustable unit and operably coupled to each motor for controlling the motors to determine the maximum and minimum lengths of said adjustable units.

References Cited

UNITED STATES PATENTS 3,172,218   3/1965   Constantin _____ 280—43.23 X
2,734,293   2/1956   Barnes _____ 280—43.23 X
2,969,990   1/1961   Szostak _____ 280—124

PHILIP GOODMAN, Primary Examiner

U.S. Cl. X.R.

280—124